May 24, 1949.  W. DEANS  2,471,200
COMPOSITE SWITCHING DEVICE

Filed June 16, 1945  4 Sheets-Sheet 1

INVENTOR.
William Deans
BY
Ostrolenk + Faber
ATTORNEYS

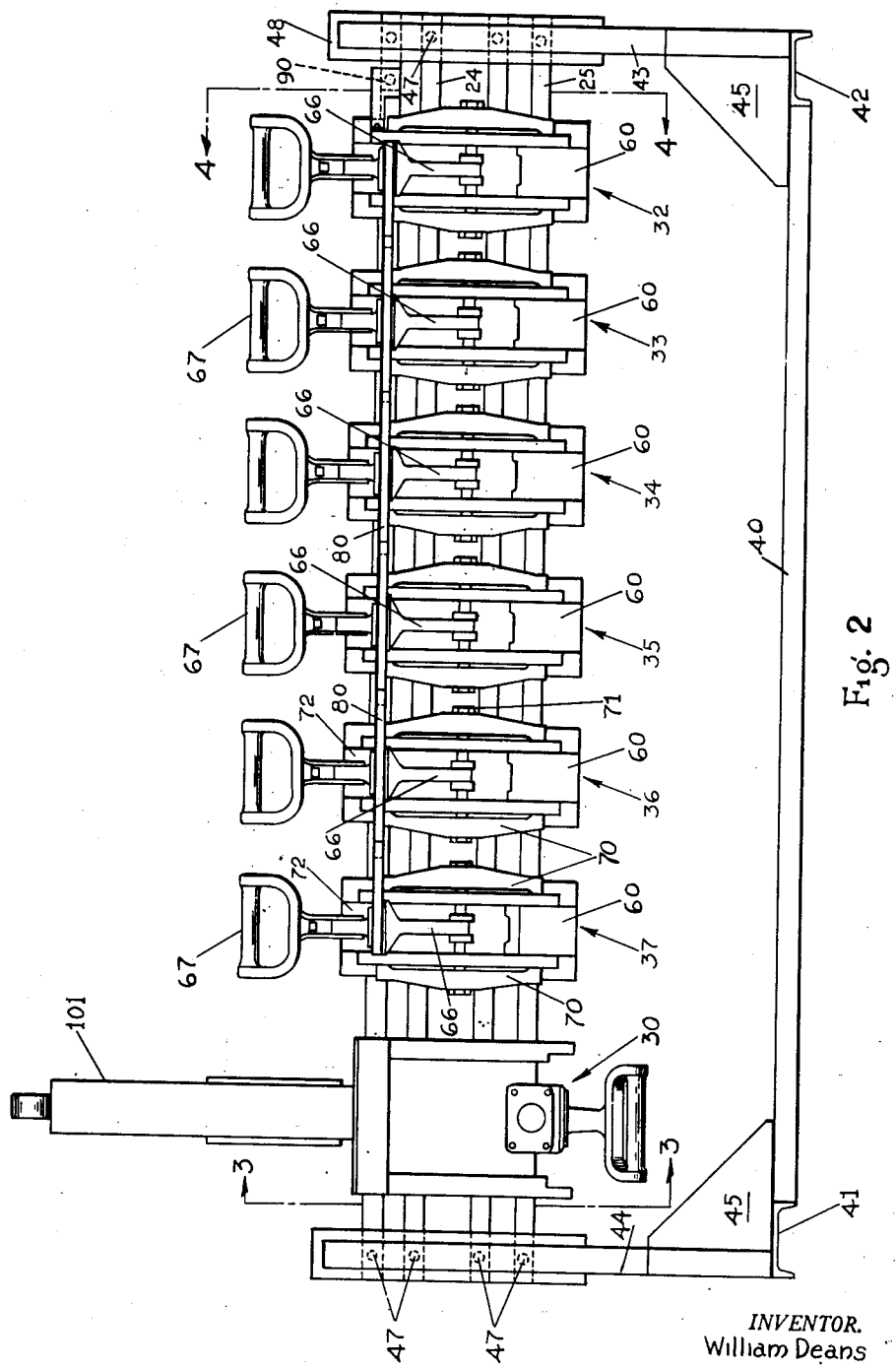

May 24, 1949.  W. DEANS  2,471,200
COMPOSITE SWITCHING DEVICE
Filed June 16, 1945  4 Sheets-Sheet 3
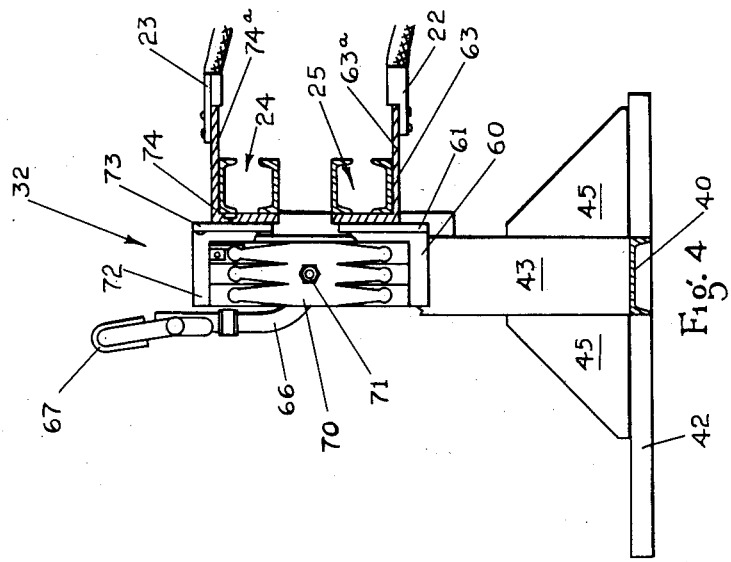
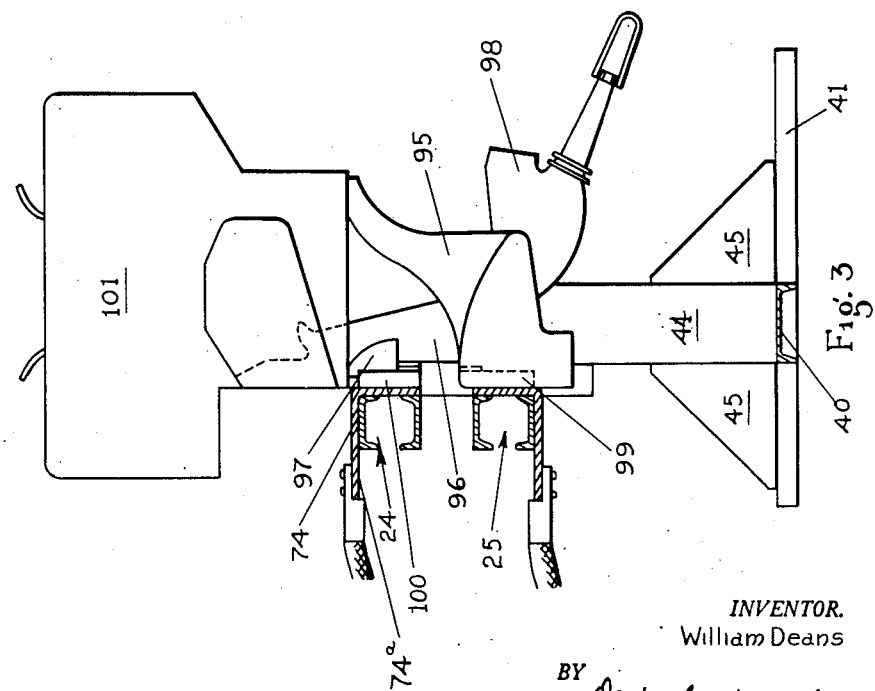
INVENTOR.
William Deans
BY Ostrolenk & Faber
ATTORNEYS May 24, 1949.　　　W. DEANS　　　2,471,200
COMPOSITE SWITCHING DEVICE
Filed June 16, 1945　　　4 Sheets-Sheet 4
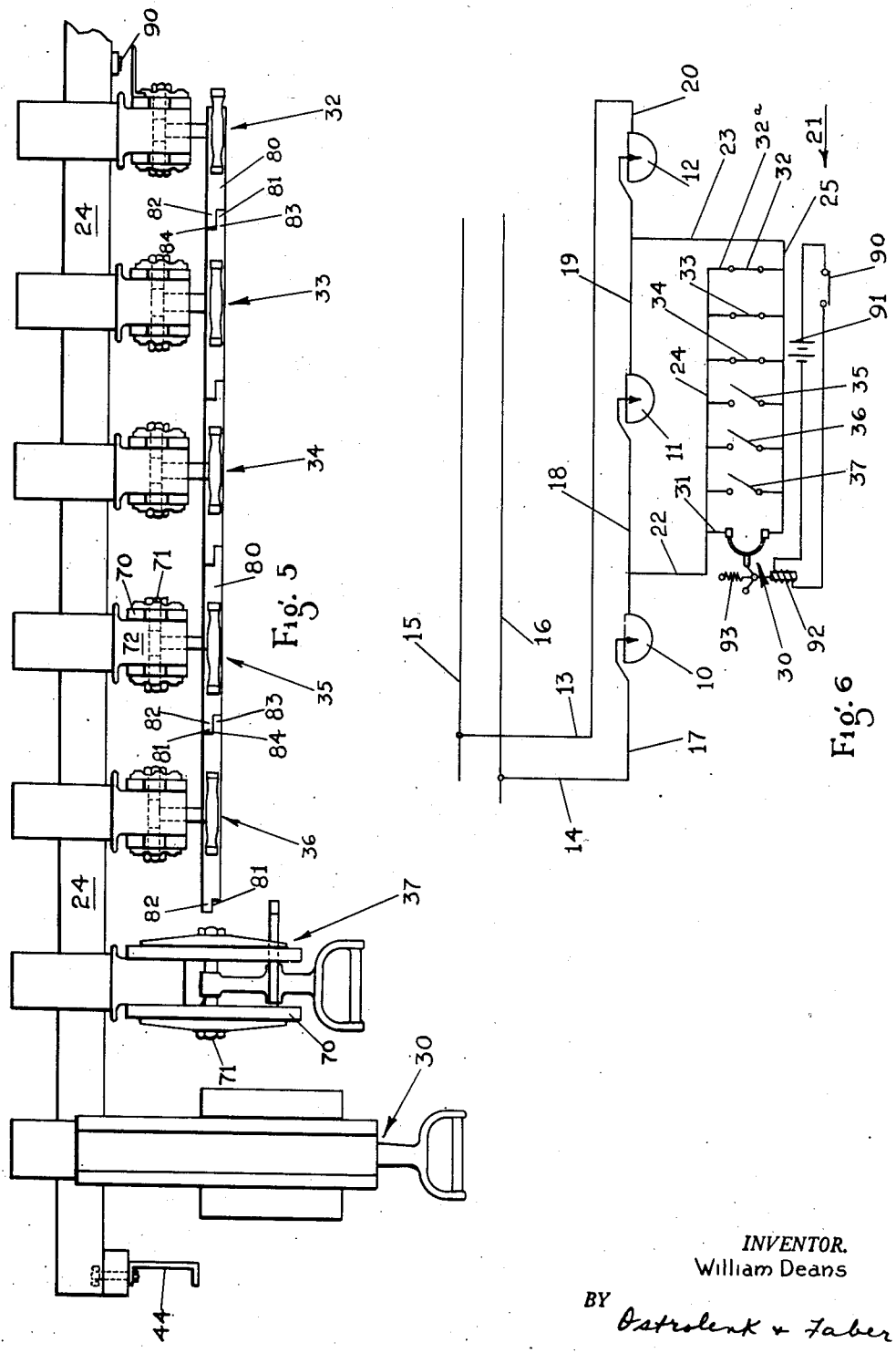
INVENTOR.
William Deans
BY Ostrolenk & Faber
ATTORNEYS Patented May 24, 1949

2,471,200

UNITED STATES PATENT OFFICE 2,471,200

COMPOSITE SWITCHING DEVICE

William Deans, Ridgewood, N. J., assignor to I. T. E. Circuit Breaker Company, Philadelphia, Pa., a corporation of Pennsylvania Application June 16, 1945, Serial No. 599,844

3 Claims. (Cl. 171—97)

My present invention relates to circuit interrupters and more particularly to a composite switching device adapted for use in electrolytic processes, as for instance in the manufacture of aluminum and magnesium, wherein electrolytic cells are used for melting and purifying of the metal. These electrolytic cells take large currents at 5 to 8 volts, a number of them being connected in series and fed from a 600 volt source. When one of these cells is taken out of service for re-lining or repair work, it is necessary to short circuit the bus around the cell.

My novel device is particularly adapted thus to by-pass the bus around an electrolytic cell connected in series with other electrolytic cells in an aluminum or magnesium manufacturing process.

Where it has been necessary in the past to disconnect cells for any purpose, this has been done by driving a large copper wedge between sections of the bus in order to by-pass the cell. When the cell is completely repaired or replaced and put back in service, the wedge is driven out by a mallet. Occasionally when a cell is put in service, good contact is not made in the cell and this results in opening a full current at 600 volts on the wedge resulting in a large amount of arcing.

My invention contemplates the provision of a composite switching device which will eliminate the necessity for following the dangerous procedure of driving the copper wedge between sections of the bus and the even more dangerous procedure of removing the wedge after the cell is replaced.

The type of device which my invention contemplates is one which will short circuit a 70,000 ampere current at 8 volts and also one which may be opened safely on such current at even greater voltages.

Essentially my invention provides a plurality of manually operated switches in parallel with each other and so arranged and mechanically interlocked that they may be closed or opened sequentially only—so that the opening or closing of the circuit will be in a step by step manner. These manually operated switches are arranged in parallel with a circuit breaker which may be closed manually but which may be tripped electrically from a remote point.

When it is necessary to remove an electrolytic cell from the cells in series and thus when it becomes necessary to by-pass the cell, the switching device with all switches open is moved up to and connected to the bus on either side of the cell by-passing the cell.

The circuit breaker is closed first establishing a circuit across the cell. The manually operated switches are closed in predetermined sequence, the first manually operated switch establishing a second circuit across the cell and each successive switch establishing another parallel circuit across the cell. This is the equivalent mechanically of driving a wedge between buses since as a wedge is driven in, better and better contact is made as the wedge is driven more tightly. Here by sequentially closing successive contacts, more and more circuits in parallel are established across the cell so that finally the circuits in parallel may readily take the full load of the system.

The cell may then be disconnected and removed for replacement or repair. On replacement of the cell the switching device is operated in reverse order to open the parallel circuits successively and the circuit breaker is tripped last from a point remote from the circuit breaker in order to protect the operator.

On final tripping of the circuit breaker, the cell takes the full load once more and the switching device may be disconnected and removed. This opening operation of the switching device is again the equivalent of driving out the wedge where as the wedge is driven out, the contact becomes poorer and poorer until the wedge is finally removed. However, since a circuit breaker with an arc extinguisher performs the final disconnecting operation, any arc which may possibly be drawn owing to poor contact within the cell, is confined within the arc extinguisher which is designed to extinguish the arc with speed.

By this step by step arrangement, a plurality of switching devices which individually may handle much less than full load may be used in place of a single switching device which would be extremely large and cumbersome. The sum total of the weight and cost of the plurality of switching devices is much less than the weight and cost of a single switching device required to handle the full load.

Further, by the use of the multiple switching device mounted in a single unit, a step by step connection and disconnection of the parallel circuits across the cell may be obtained.

A principal object of my invention, therefore, is the provision of a multiple switching device with interlock means thereon to ensure predetermined step by step sequential operation of the switches either to open or close a circuit.

Another object of my invention is the provision of a switching device adapted to be placed across an electrolytic cell in an electrolytic process to short circuit the cell so that the same may be removed for replacement and repair, the said switching device providing step by step means for connecting and disconnecting by-pass circuits around the electrolytic cell sequentially.

Another object of my invention is the provision of novel mechanical interlock means for a multiplicity of switching devices.

The foregoing and many other objects of my invention will become apparent in the following description and drawings in which Figure 1 is a view in perspective of my novel switching device embodying six manually operated knife switches and a circuit breaker which may be manually closed but which may be tripped from a remote point.

Figure 2 is a front view of the switching device of Figure 1.

Figure 3 is a side view partly in section of the switching device taken from line 3—3 of Figure 2 looking in the direction of the arrows.

Figure 4 is a side view partly in section of the switching device of Figures 1 and 2 taken on line 4—4 of Figure 2 looking in the direction of the arrows.

Figure 5 is a top view of the switching device of Figure 1.

Figure 6 is a circuit diagram illustrating the operation of my novel switching device.

Figure 1:
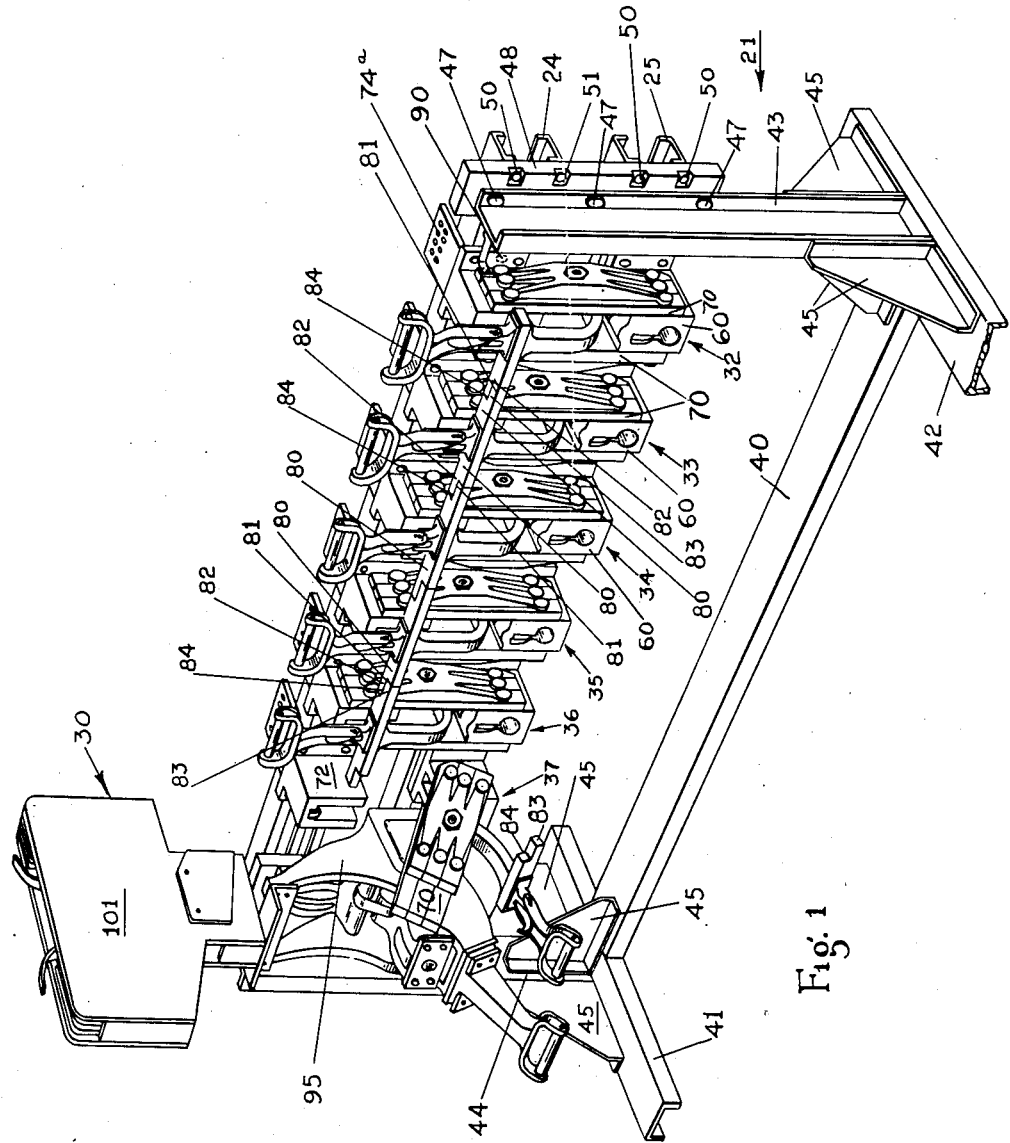

Referring first to Figure 6, I have here shown a simple circuit diagram illustrating the operation of my novel switching device. A plurality of electrolytic cells 10, 11 and 12 in series are fed by bus conductors 13, 14 from the feeders 15, 16. The electrolytic cells 10, 11, 12 are connected with each other and with the bus conductors 13, 14 by short bus sections 17, 18, 19, 20.

Assuming now that the electrolytic cell 11 is to be removed for any purpose, my novel switching device 21 is moved up adjacent to cell 11 and conductors 22, 23 of the switching device 21 are connected to bus sections 18, 19 across the cell 11. All switches are open in the switching device 21 at this time. Connecting member 22 is connected to the bus 24 in the switching device and connecting member 23 is connected to the bus 25 in the switching device.

The operator first manually closes the circuit breaker 30 which closes the circuit 31 between buses 24 and 25 so that a single circuit through conductor 31 is established across the cell 11. The operator then closes switch 32 to connect the conductor 32a across the buses 24 and 25 and hence across the cell 11, and then sequentially closes switches 33, 34, 35, 36, 37. At the completion of this operation, it will be seen that seven parallel circuits are established through the six switches 32—37 and the circuit breaker 30. The cell 11 may now be disconnected from the bus section 18, 19 and removed for replacement or repair.

When the cell 11 is reconnected, then the sequence for opening the switches as determined by the mechanical interlock herein described is as follows: Switches 37, 36, 35, 34, 33 and 32 are opened in the order named and then the circuit breaker 30 is tripped open from a remote point. When all of the switches of the circuit breaker are opened, cell 11 takes the full load and connectors 22 and 23 may be disconnected from the buses 18 and 19 and the switching device removed.

A single switching device 21 may be permanently located adjacent the bus for a group of cells or the switching device 21 may be mounted on appropriate rollers and moved from group to group as the occasion requires.

If, after all the switches 32 to 37 are open, the circuit breaker 30 trips with a substantial arc, that is an immediate indication that the cell 11 is not properly connected or that a proper current carrying contact is not established therein and the circuit breaker 30 and switches 32 to 37 may then immediately be closed successively to reestablish the parallel circuits so that the cell 11 may again be removed for test. If, however, after the switches all open, circuit breaker 30 trips with no arc, or practically no arc, then that is an indication that the cell 11 is now in proper condition and the switching device 21 may be disconnected and removed.

The essential element of my invention is that the switches are so interlocked that they cannot be opened simultaneously or that two or more of them cannot be opened at one time. They must be opened sequentially, one circuit being broken before the next one is broken and they can be opened only as fast as an operator may move from switch to switch to open the same. This is achieved by the particular mechanical interlock clearly shown in the remaining figures.

In Figures 1 and 2 I have shown the switches 32 to 37 respectively as knife switches of the type shown in Patent No. 2,246,072, assigned to the assignee of the present invention, and the circuit breaker 30 as a circuit breaker of the type shown in Patent No. 2,355,075, also assigned to the assignee of the present invention. The base of the switching device 21 comprises a longitudinal channel 40 mounted between a pair of cross channels 41, 42. Cross channels 41, 42 carry channel shaped standards 43, 44 suitably supported by flanged brackets 45, 45 on the base 40—41—42. Standards 43—44 which are channel shaped, as above pointed out, have secured to the back thereof in any suitable manner, as for instance by bolts 47, insulating plates 48. The insulating plates carry buses 24, 25 which are secured thereto also in any suitable manner by bolts 50 mounted in recesses 51 of the insulating plates 48.

The buses 24 and 25 as shown in Figure 1 each comprise a pair of parallel channel sections with the flanges of the channels directed toward each other. This is a common bus construction.

Each of the knife switches is supported between the buses 24, 25 as shown particularly in Figure 4, wherein it is seen that the knife switch 32 has a T-shaped terminal block 60 having the cross plate 61, which in turn is connected to the angle plate 63. Angle plate 63 is secured to the bus and establishes contact therewith. One of the six angle plates 63 is extended at 63a to furnish a connecting means for connector 22 (see also Figure 6).

The operating arm 66 is rotatably mounted in any suitable manner on the terminal block 60 and is provided with a handle 67 for appropriate rotation of the operating arm 66 with respect to the terminal block 60. Operating arm 66 carries clamp type bridging contacts 70 mounted thereon by the bolt 71. When the operating arm 66 is moved to closed position, bridging contacts 70 on each side as seen in Figures 4 and 1 connect the lower terminal block 60 with the upper terminal block 72. The upper terminal block 72 is also T-shaped, having the cross plate 73.

Cross plate 73 of the uper terminal block 72 is connected to the connecting late 74 which interconnects the two channel sections of bus 24. One of the plates 74 has an extension 74a for connector 23 (see also Figure 6).

Accordingly blocks 60 and 72 act as the stationary contacts and the clamping members 70 are the bridging contacts of each knife switch. The switch herein shown is more specifically described in Patent No. 2,246,072.

It is desirable that the switches be operable in a predetermined sequence. To this end each of the handles 66 of the switches 32 to 37 is provided with the cross bar 80 (Figures 1, 2 and 5). Each cross bar 80 in the specific embodiment shown in Figures 1, 2 and 5 is provided at its left-hand end with a recess 81 at the front left corner and a tongue 82 at the back left corner. Obviously the cross bar of the knife switch 37 requires no such tongue or recess on the left-hand end.

Each cross bar 80 is also provided at its right-hand end with a tongue 83 at its front right corner and a recess 84 at its back right corner.

As shown in Figures 1, 2 and 5, the right-hand tongues 83 on each cross bar 80 register with the left-hand recess 81 of the adjacent cross bar 80 to the right thereof; and each left-hand tongue 82 registers with the right-hand recess 84 of the cross bar to the left thereof. Obviously the knife switch 32 which has no switch to the right thereof does not require a right-hand tongue extension.

It will thus be seen that in the embodiment shown, knife switch 32 must be closed before knife switch 33 can be closed. Any attempt to close the knife switch 33 before knife switch 32 is closed will result in the cross bar of knife switch 33 striking cross bar of 32 and pushing the knife switch 32 up.

Since the knife switches are designed so that a specific manual force is required to close the same, this will double the amount of force necessary to close knife switch 33, and the operator will then desist from closing knife switch 33 and will first close knife switch 32. Accordingly, the arrangement of tongues and recesses of cross bars 80 requires that the knife switch 32 be closed first and then sequentially switches 33, 34, 35, 36 and 37. Circuit breaker 30 is closed as above described before any of the knife switches are closed.

During the opening operation it will be clear that knife switch 32 cannot be opened first because any attempt to do so is blocked by all of the closed knife switches 33 to 37. Accordingly the operator must first open the knife switch 37 and then knife switch 36, and sequentially down to switch 32. The trip button 90 for the circuit breaker 30 is mounted just alongside and to the right of the knife switch 32 so that the button 90 is operated last in the ordinary operation of the device.

The trip button 90 may be replaced by a lever which is operated only when the handle of the knife switch 32 is moved to full open position; so that when the operator finally reaches knife switch 32 which is the last of the knife switches to be opened and completes the opening of the same, the pushing of the handle thereof to the full open position will result in tripping of circuit breaker 30. In ordinary cases, however, the placement of the push button 90 at the end of the switching device 21 to the right of the last knife switch 32 is sufficient.

As seen in Figure 6, push button 90 is arranged so that it is in series with a direct current source 91 and the coil 92. On pushing in the push button 90, closing coil 92 is disconnected from the current source 91 and spring 93 may now effect the tripping operation of the circuit breaker 30. This is shown only schematically. It is obvious, of course, that a push button may be so arranged that it will connect a trip coil of the circuit breaker across an appropriate current source to trip the circuit breaker rather than disconnect a closing coil of the circuit breaker.

In the event the device is such that the operation of the push button 90, either directly or by mechanical means interlocked with the switch 32, will trip the circuit breaker 30.

The circuit breaker 30 is more fully described in Patent No. 2,355,075 and as shown partially in Figures 1, 2 and 3, has a housing 95 for the operating mechanism and the contacts, which housing is insulatedly supported from the buses 24 and 25. The contacts comprise a bridging contact 97 mounted on a contact lever 96 operated by the handle 98 to closing position to bridge contact elements 99 and 100, which are connected respectively to buses 25 and 24.

Any arc which is drawn may be readily extinguished by the arc extinguisher 101.

It will thus be seen that in operation my switch device 21 is brought up or located adjacent to the cell which is to be replaced. Connectors from buses 24 and 25 are placed across the cell. The circuit breaker 30 is closed; then the knife switches 32 to 37 are closed in that order thus placing seven parallel circuits across the buses 24 and 25 and therefore across the cell 11. Cell 11 is removed and repaired or replaced and then replaced between the bus sections 18 and 19 in series with the remaining cells.

The switches are opened sequentially, knife switch 37 being opened first and knife switch 32 last, and then the circuit breaker 30 is tripped by the operation of the push button 90. The switching device 21 may thus readily be connected across the cell 11 and then disconnected after the cell 11 is replaced; and when connected, with the cell 11 withdrawn, it may carry the full 70,000 ampere current at 8 volts owing to the plurality of parallel connectors.

After the cell 11 is inserted in parallel with the entire switching device, then the switches as they are opened need not interrupt the full current and may readily be opened sequentially, gradually to decrease the number of parallel circuits across the cell 11 and thus finally to place the cell 11 in series with the other cells.

Accordingly the circuit breaker 30 when it is finally tripped, interrupts a relatively low current since by this time the cell 11 which is an electrolytic cell has begun to operate and has a relatively low resistance.

Accordingly the circuit breaker 30 need be one which is adapted only to carry approximately 1500 amperes under normal conditions and need not be adapted to carry as heavy a current as 70,000 amperes.

By this means, therefore, the multiple connector in the specific embodiment shown comprises seven separate connectors mounted together and is much less cumbersome and much less expensive than a single connector or interrupter adapted to carry the full 70,000 amperes.

In the foregoing I have described my invention only in connection with a specific embodiment thereof. Since many modifications and variations of my invention should now be obvious to those skilled in the art, I prefer to be bound not by the specific disclosures herein but only by the appended claims.

I claim:

1. A switching device for sequentially establishing and disconnecting a plurality of parallel circuits across an electrolytic cell in series with other electrolytic cells; said switching device comprising a support; a plurality of switches carried by said support; a handle individual to each of said switches; and an interlock member carried by each handle; each interlock member being engageable with the interlock member of an adjacent switch; the interlock member of one switch being arranged to block the movement of the interlock member and handle of an adjacent switch when the handles are in one position; and the interlock member of said adjacent switch being arranged to block movement of the interlock member and handle of said first mentioned switch when the handles are in another position, each of said switches being arranged on operation of the handle to establish or disconnect one of said parallel circuits; and a circuit breaker member mounted on said support and arranged to connect and disconnect an additional circuit in parallel across said electrolytic cell; and means for opening said circuit breaker member after all of the other switches have been opened, said circuit breaker member having an arc extinguisher.

2. A switching device for sequentially establishing and opening a plurality of parallel circuits across an electrical device; a plurality of switches carried by said support; a handle individual to each of said switches; and an interlock member carried by each handle; each interlock member being engageable with the interlock member of an adjacent switch; the interlock member of one switch being arranged to block the movement of the interlock member and handle of an adjacent switch when the handles are in one position; and the interlock member of said adjacent switch being arranged to block movement of the interlock member and handle of said first mentioned switch when the handles are in another position, each of said switches being arranged on operation of the handle to establish or disconnect one of said parallel circuits, said switching device having a pair of conductors; said switches each having a pair of terminals; one terminal of each switch being connected to one conductor; the other terminal of each switch being connected to the other conductor for connection of said switching device across said electrical device, a circuit breaker member mounted across said conductors; and means for opening said circuit breaker member after all of the other switches have been opened; said circuit breaker member having an arc extinguisher.

3. In a switching device for use for by-passing electrical apparatus in an electrical circuit, a plurality of manually operated switches connected in parallel, a circuit breaker connected in parallel with said switches, said switches and circuit breaker being connected across the terminals of said electrical apparatus to be by-passed, the combined current carrying capacity of said switches and circuit breaker being sufficient to carry the full current flowing in said circuit and said circuit breaker having a current carrying capacity considerably less than the current of said circuit but able to carry said current for a short interval of time while the contacts of said switches are being closed, remotely operated means for operating said circuit breaker to control the closing of said circuit breaker before any of said switches are closed and for controlling the opening of said circuit breaker after all the other switches have been opened, and arc extinguishing means for said circuit breaker.

WILLIAM DEANS.

REFERENCES CITED

The following references are of record in the file of this patent:

UNITED STATES PATENTS

| Number | Name | Date |
| --- | --- | --- |
| 1,465,384 | Wescoat | Aug. 21, 1923 |
| 2,349,631 | Lindstrom et al. | May 23, 1944 |